Figure 1:
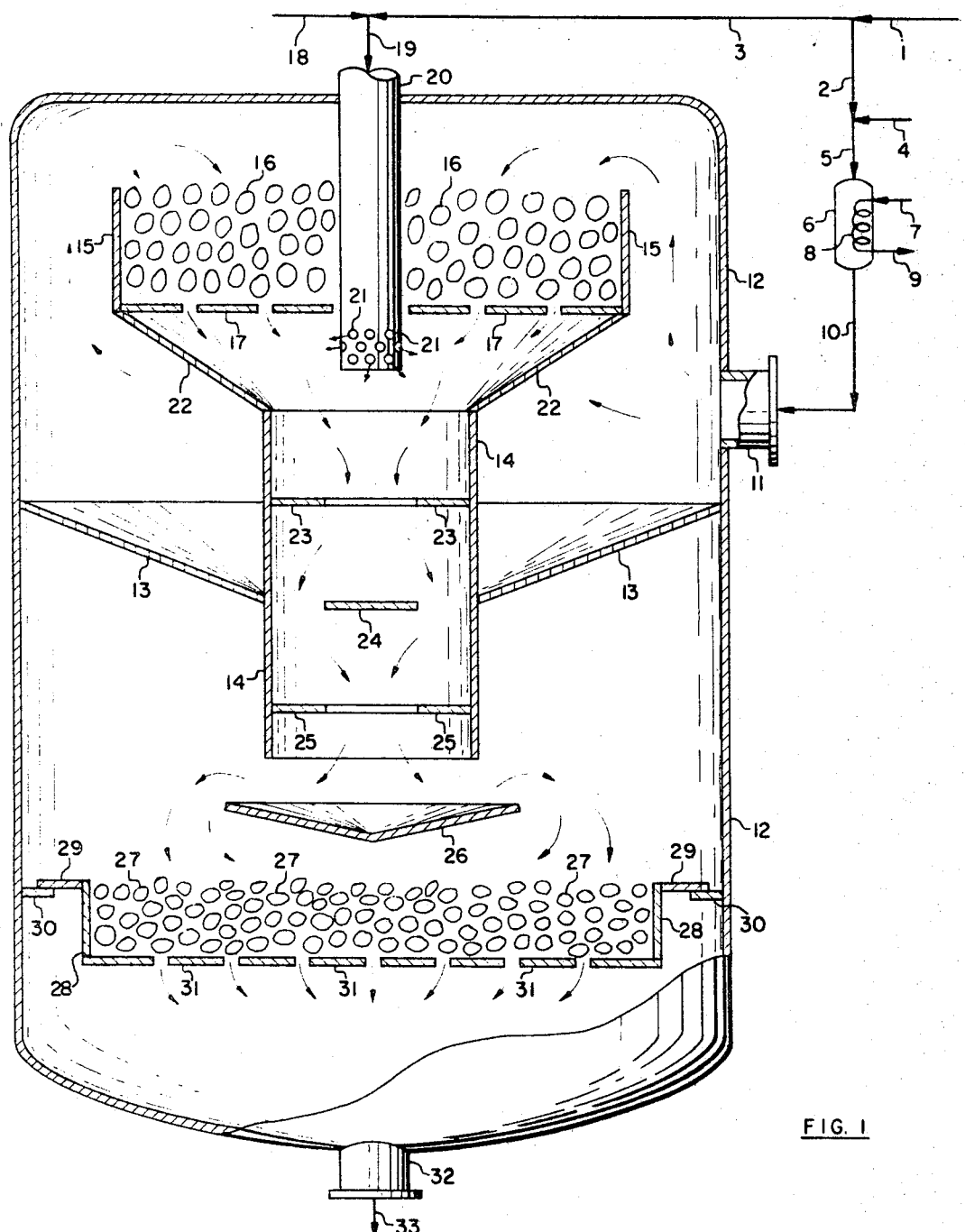

DANIEL J. NEWMAN
LOUIS A. KLEIN
INVENTORS.

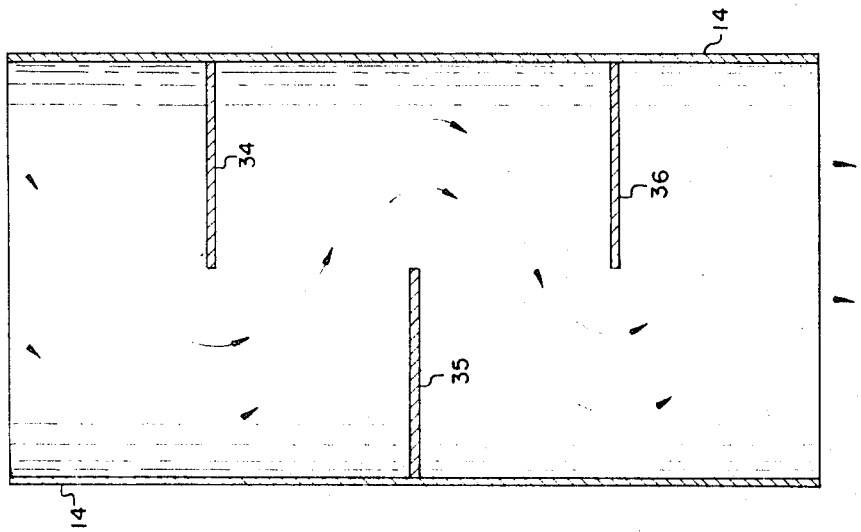
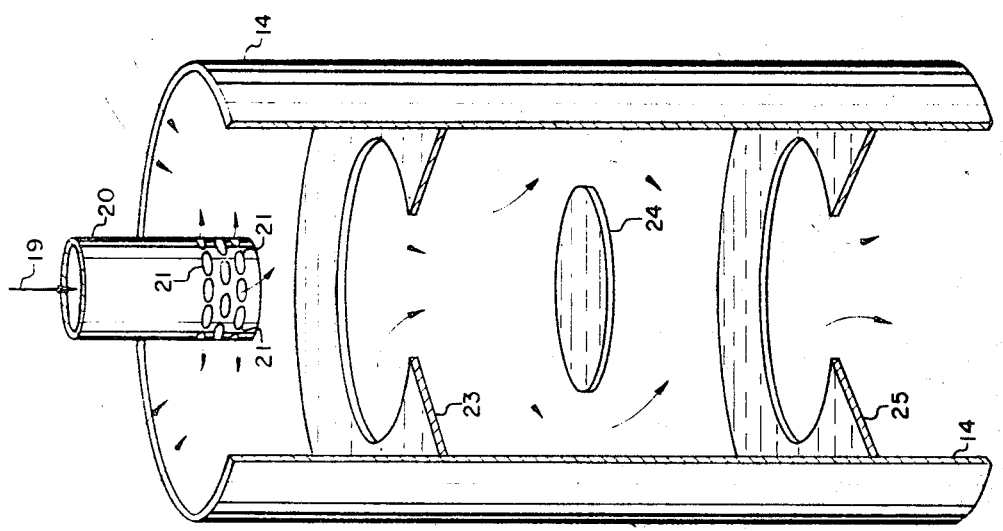
DANIEL J. NEWMAN
LOUIS A. KLEIN
INVENTORS.
BY
AGENT

United States Patent Office 3,443,910
Patented May 13, 1969

3,443,910
APPARATUS FOR EXOTHERMIC CATALYTIC REACTIONS
Daniel J. Newman, Jackson Heights, and Louis A. Klein, Flushing, N.Y., assignors to Chemical Construction Corporation, New York, N.Y., a corporation of Delaware
Filed June 3, 1966, Ser. No. 555,108
Int. Cl. B01j 9/04
U.S. Cl. 23—288          17 Claims The present invention relates to an improved apparatus for carrying out exothermic catalytic reactions in a plurality of stages, in which the reaction stream must be passed through the catalyst beds above a minimum ignition temperature for the particular catalyst, and in which a cold fluid is added to the main reactant stream between stages of catalysis in order to moderate the reaction. The apparatus of the invention is particularly applicable to the catalytic elimination of nitrogen oxides from gas streams in a two stage process sequence by catalytic reduction, such as is described in U.S. patent application No. 409,507 filed Nov. 6, 1964.

The apparatus of the present invention will be described with respect to application to the catalytic elimination of nitrogen oxides from a gas stream such as the tail gas from a nitric acid plant, however, the apparatus is also applicable and useful for carrying out exothermic catalytic reactions in general, such as the catalytic synthesis of ammonia or methanol.

Various industrial processes such as the production of nitric acid and the nitration of organic compounds produce waste gas streams containing small proportions of nitrogen oxides, principally as nitric oxide and nitrogen dioxide. The concentrations of nitrogen oxides in such waste gas streams is too small to be economically recovered. Discharge of such waste gas streams into the atmosphere is highly objectionable, since the nitrogen oxides are corrosive and act as atmospheric pollutants. Thus, such waste gas streams must be treated in order to eliminate nitrogen oxides prior to discharge of the waste gas stream into the atmosphere.

The usual approach is to catalytically react the waste gas stream containing nitrogen oxides with a reducing gas such as methane or hydrogen, by means of an exothermic catalytic reaction in the presence of a suitable catalyst. Hydrogen, methane, or natural gas principally consisting of methane is generally employed, due to economic considerations, however in some instances ethane, propane or refinery off-gas streams may also be effectively employed as a reducing gas. The catalyst generally employed is a platinum group metal such as platinum, palladium, rhodium, ruthenium, osmium or iridium, or a mixture of such metals. The catalyst may be in the form of metallic unsupported wire mesh or grid, however, the metallic catalyst is generally deposited and supported on a suitable carrier such as alumina pellets, Nichrome wire or silica gel. In some instances, the active platium group metal component is deposited on a carrier which is in the form of balls, extrusions, or a honeycomb grid.

The catalytic reaction of the nitrogen oxides with the reducing gas results in the elimination of the nitrogen oxides, with the formation of free nitrogen and water vapor and/or carbon dioxide. When free oxygen is also present in the waste gas stream, as in the case of a tail gas from a nitric acid process, the free oxygen preferentially reacts with the reducing gas before the nitrogen oxides, and must be eliminated before the destruction of the nitrogen oxides can take place. In any case, a final waste gas stream free of nitrogen oxides and suitable for discharge into the atmosphere is produced. The treated tail gas from a nitric acid process, when freed of nitrogen oxides, is also usable as a nitrogen source for ammonia synthesis.

The reactants must be heated to a minimum elevated temperature, known as the ignition temperature, before the catalytic reaction will take place. In the case where methane is employed as the reducing gas, a minimum ignition temperature of about 480° C. is provided, in order to attain catalytic reaction of the methane with the nitrogen oxides and oxygen. Since the reaction between methane and oxygen or nitrogen oxides is exothermic, it is apparent that the resulting waste gas stream is produced at a highly elevated temperature. Thus, the waste gas stream is generally passed through a waste heat boiler and/or a power recovery expander such as a gas turbine, after catalytic removal of nitrogen oxides, and is then discharged to the atmosphere.

Many exothermic catalytic reactions may be and are carried out in one stage within a single catalyst bed, to produce a hot product fluid stream, which may be either gaseous or liquid, depending on the particular process environment and reactants. The initial approach of reacting a reducing gas such as methane with a waste gas containing nitrogen oxides in one catalytic step, with an initial gas ignition temperature of about 480° C., yields a final gas operating temperature of 800° C. to 950° C. when a typical free oxygen content of 2.5% to 3.5% is present, and presents difficulties in design and operation. The reacted gas would normally be passed to a waste heat boiler immediately after catalytic reaction and cooled to a desired temperature. Since the desired temperature may be 500° C. to 650° C. when the gas flows to a power recovery expander such as a gas turbine, control of the temperature may be quite difficult, involving operating of a control valve at 800° C. to 950° C. In addition, the catalysts which are best suited for reduction of the nitrogen oxides may not be recommended for operation at these higher temperatures, since exposure of the catalysts to excessive temperatures is detrimental in that a loss of catalyst activity rapidly takes place.

A second approach to the problem of excessive temperature rise during exothermic catalytic elimination of nitrogen oxides, as described in U.S. Patent No. 2,970,034, involves the use of two catalyst charges or beds with intermediate cooling of the partially reacted waste gas. The incoming hot waste gas at a temperature above 480° C. is reacted with less than the stoichiometric quantity of fuel such as methane. This serves to raise the gas stream temperature to a moderately higher level of about 670° C. The gas stream is cooled back to 480° C. in a heat exchanger or boiler and then reacted with additional fuel in a second catalyst combustor or catalyst bed to eliminate all oxygen and nitrogen oxides. Operation of this system involves the provision of the intermediate heat exchanger or boiler, which is an extra item of equipment, as well as ancillary control devices. A catalytic device of this nature adopted especially for use in the catalytic oxidation of sulfur dioxide is described in U.S. Patent No. 1,782,824.

An additional sequence for carrying out exothermic catalytic reactions, as described in U.S. Patents Nos. 2,472,254, 2,512,586 and 2,801,159, entails the provision of a multi-bed system with interbed injection of cold quench gas, which may consist of a portion of the main feed gas stream.

In the present invention, an improved apparatus is provided for accomplishing exothermic catalytic reactions, such as the catalytic reduction of nitrogen oxides in a waste gas stream by the process described in U.S. patent application No. 409,507 filed Nov. 6, 1964. The apparatus involves the provision of a multi-bed catalytic system, through which the main stream of fluid is passed in series, with interbed injection of quench fluid. The apparatus is particularly applicable to a catalytic procedure in which a fluid must be heated up to an elevated ignition temperature below which the catalytic reaction does not take place. In this case, the initial fluid is heated to a temperature of at least the minimum ignition temperature for catalytic reaction and is then passed through the first catalyst bed, with resultant catalytic reaction and temperature rise. The quench fluid is then added to reduce the main fluid stream temperature to a lower level above the minimum ignition temperature, and the combined fluid is then passed through the second catalyst bed for further exothermic reaction. This sequence may be repeated as many times as desired, with interbed quenching before each succeeding catalyst bed.

The apparatus combination of the present invention includes a container in which the two catalyst beds are disposed in series, generally with the container being vertically oriented and the catalyst beds being aligned with the initial bed being vertically above the second bed. An annular partition baffle is provided within the container, and extends inwards from the vertical side wall of the container to a vertical conduit which is centrally disposed within the container. The initial catalyst bed is positioned in the container above the upper end of the central conduit, and this bed is defined by an annular vertical partition which is spaced away from the side wall of the container so as to provide an annular vertical passage within the container. The first fluid stream, preheated to a temperature of at least the ignition temperature of the catalyst bed, is passed into the container above the partition baffle, and flows upwards through the annular vertical passage, thus serving to protect the walls of the container from highly elevated temperatures within the first catalyst bed, and then downwards through the first or initial catalyst bed. A duct is provided which preferably extends centrally downwards into the container and through the initial catalyst bed, and terminates with an outlet which is preferably foraminous. The quench fluid is passed through the duct and is added to the hot reacted fluid discharged downwards from the first catalyst bed. The resulting combined fluid stream is passed into the upper end of the central vertical conduit, and flows downwards through the condit. A group of spaced apart and staggered internal baffles are provided within the conduit, so that the combined fluid stream is uniformly mixed while flowing downwards through the central vertical conduit. The resulting mixed fluid stream, now at an intermediate temperature above the ignition level for the catalytic reaction, flows downwards from the central conduit and into a second catalyst bed disposed in the container below the conduit. A second catalytic reaction thus takes place, and the fully reacted fluid stream is removed from the container below the second catalyst bed.

The apparatus of the present invention provides several important advantages. The apparatus is readily fabricated and easily assembled. When the process gas stream is reacted at elevated pressure, the annular flow of the incoming main gas stream serves to protect the walls of the container from the highly elevated temperatures generated within the first catalyst bed, and thus the container consists of a less costly pressure vessel. The annular partition baffle serves also as a support for the central vertical conduit and upper catalyst bed, and thus thermal expansion of the assemblage may take place without the provision of expansion joints or seals. The central vertical conduit serves not only to conduct the combined fluid stream through the annular partition baffle to the lower catalyst bed, but also provides a mixing effect due to the provision of the plurality of spaced apart and staggered horizontal internal baffles. Finally, the apparatus is an improved unitary assemblage which permits effective exothermic catalytic reaction in processes in which the catalyst bed must be at a temperature above a minimum ignition temperature in order to initiate the reaction.

It is an object of the present invention to provide an improved apparatus for carrying out exothermic catalytic reactions.

Another object is to provide an apparatus for carrying out exothermic catalytic reactions in which the catalyst bed must be at a temperature above a minimum ignition temperature in order that effective reaction may take place.

A further object is to provide an apparatus for exothermic catalytic reactions which are carried out in a plurality of beds with interbed quench cooling by addition of a cold fluid.

An additional object is to provide an apparatus for exothermic catalytic reactions which is readily fabricated and easily assembled.

Still another object is to provide an apparatus for exothermic catalytic reactions in which an annular partition baffle serves as an integral support and accommodates for thermal expansion without the provision of expansion joints.

Still a further object is to provide an apparatus for exothermic catalytic reactions in which the cold quench fluid is mixed with the main reacted fluid stream between catalyst beds in an improved manner.

These and other objects and advantages of the present invention will become evident from the description which follows. Referring to the figures, FIGURE 1 provides an overall elevation view of the apparatus, FIGURE 2 is an isometric elevation view of the fluid mixing section of the apparatus which shows the staggered relationship of the spaced apart horizontal internal baffles within the central vertical conduit, as well as an alternative location of the outlet end of the central duct at the inlet of the central vertical conduit, and FIGURE 3 is a sectional elevation view of an alternative arrangement of the staggered and spaced apart horizontal internal baffles within the central vertical conduit.

Referring now to FIGURE 1, the waste gas stream 1 containing nitrogen oxides is divided into the first portion stream 2 and the second portion stream 3. A reducing gas stream 4 is added to stream 2 to form a mixed gas stream 5. As discussed supra, the reducing gas stream 4 may consist of any suitable gas having reducing properties, however stream 4 will preferably consist of hydrogen or methane. Stream 5 is passed into heat exchanger 6, and is heated to a suitable temperature above the minimum ignition temperature for the subsequent catalytic reaction, which in the present instance is about 480° C. A hot fluid stream 7 is passed into coil 8 disposed within unit 6, and cooled fluid stream 9 is passed to reheating or other utilization. As discussed in U.S. patent application No. 409,507 filed Nov. 6, 1964, stream 7 may be derived from the catalytic oxidation of ammonia to nitrogen oxides as practiced in a nitric acid facility, in instances when stream 1 is the tail gas from the nitric acid plant. Stream 5 may also be indirectly heated in a hydrocarbon-fired furnace, or by electrical resistor heating elements, in suitable instances.

The resulting hot mixed gas stream 10 derived from unit 6 is passed via nozzle 11 into vertically oriented container 12, which is preferably a cylindrical vessel. Nozzle 11 is located above the annular partition baffle 13, which serves to divide the container 12 into upper and lower sections. Baffle 13 is shown in this preferred embodiment of the invention as consisting of an inverted truncated conical element, however baffle 13 may also be horizontal or extend conically upwards. As will appear infra, baffle 13 extends inwards to the central vertical conduit 14, and serves to support conduit 14.

The gas stream 10 rises within the upper portion of container 12, and flows upwards through the annular vertical passage defined between the wall of container 12 and the annular vertical partition 15, which serves to define and retain catalyst bed 16. The upward flow of the gas stream in this annular vertical passage serves to insulate the wall of container 12 from the more highly elevated temperatures within bed 16. The partition 15 will usually be cylindrical and coaxial with container 12. The gas stream next flows downwards through catalyst bed 16, and exothermic catalytic reaction takes place with at least partial elimination of nitrogen oxides from the gas stream. As discussed supra, this catalytic reaction may be attained by contact of the hot gas stream with a platinum group metal per se, preferably consisting of platinum or palladium, and thus bed 16 may in some instances consist of a mesh or grid of platinum group metal. In most instances, however, bed 16 will consist of a platinum group metal such as platinum or palladium deposited on a suitable carrier, thus bed 16 may consist of a refractory or ceramic honeycomb having a surface deposit of platinum group metal.

The resultant hot reacted gas produced in bed 16 flows downward through support grid 17, and is now cooled or quenched by the addition of colder gas or other fluid. The colder gas in this embodiment of the invention is obtained by adding a reducing gas stream 18 to the waste gas portion stream 3. The resulting mixed gas stream 19 is passed downwards through duct 20, which is preferably coaxial with container 12 and extends downwards through bed 16 to a lower foraminous outlet below grid 17. Openings 21 are provided in the lower part of duct 20 to enable the quench gas stream 19 to disperse outwards into the hot reacted gas. The combined gas streams below grid 17 are now passed downwards into the central vertical conduit 14, which is preferably cylindrical and coaxial with container 12. An inverted truncated conical partition 22 is provided to uniformly pass the gas streams into the upper end of conduit 14. The partition 22 extends downwards from the lower end of partition 15 to the upper end of conduit 14.

The gas stream now flows downwards within conduit 14, and is thoroughly and uniformly mixed in conduit 14 to attain a uniform temperature level below the highly elevated temperature generated in bed 16 and above the minimum ignition temperature for subsequent catalytic reaction. Uniform mixing is attained by the provision of a plurality of spaced apart and staggered horizontal internal baffles 23, 24 and 25. As will appear infra during discussion of FIGURE 2, baffles 23 and 25 consist preferably of annular ring baffles which extend inward from the wall of conduit 14 and terminate at a central opening, and baffle 24 preferably consists of a circular central baffle which is spaced away from the wall of conduit 14 to provide an annular opening. A lateral motion is imparted by baffles 23, 24 and 25 to the gas stream flowing downwards through conduit 14, with resultant uniform mixing.

The resultant gas stream discharged downwards from the lower end of conduit 14, is now at a suitable temperature for further exothermic catalytic reaction in a second catalyst bed. A substantially horizontal baffle 26 is preferably provided below the lower outlet of conduit 14, and serves to disperse the gas stream uniformly outwards prior to further catalytic reaction. Baffle 26 is preferably in the form of a flat inverted cone, to attain uniform dispersion of the gas stream. The outwardly dispersed gas stream now flows downwards into catalyst bed 27, which is generally similar in configuration, composition and function to bed 16 described supra. Bed 27 is preferably retained and defined by annular vertical cylindrical partition 28, which is spaced away from the side wall of the container 12 so as to provide an annular thermal insulation space within the container 12 adjacent to the catalyst bed 27, thus serving to at least partially protect the side wall of container 12 from elevated temperatures generated within bed 27. The partition 28 is supported by upper outwardly extending lip 29, which in turn rests on ring 30 which is attached to the inner wall of container 12. As an alternative to ring 30, lugs or a notch in the wall of container 12 may be provided. The hot fully reacted gas stream passed downwards from bed 27 through openings in support grid 31, and is discharged from lower outlet nozzle 32 as stream 33.

Referring now to FIGURE 2, a sectional isometric view of the central vertical conduit 14 is presented, showing the staggered relationship of the horizontal internal baffles 23, 24 and 25 in which baffles 23 and 25 consist of annular ring baffles extending inwards from the wall of conduit 14 and terminating at a central opening, and baffle 24 consists of a circular central disc-shaped baffle which is spaced away from the wall of conduit 14 to provide an annular opening. FIGURE 2 also illustrates an alternative embodiment of the invention, in which the central duct 20 extends downwards and terminates with a foraminous outlet adjacent to the inlet end of conduit 14. In this case, the cold gas discharged through openings 21 is projected outwards into the annular gas stream moving at high velocity, and a more rapid and thorough mixing effect is obtained, however greater gas pressure drop is caused by this arrangement. Consequently, this arrangement consumes more power than the apparatus arrangement of FIGURE 1, in which the foraminous outlet of duct 20 is spaced above the inlet of conduit 14.

An alternative arrangement of the staggered horizontal internal baffles within conduit 14 is illustrated in FIGURE 3. In this arrangement, the baffles 34, 35 and 36 alternately extend inwards into conduit 14 from opposite sides of the inner wall. In the case of the preferred cylindrical configuration of conduit 14, the baffles 34, 35 and 36 will be semi-circular in plan view.

Numerous alternatives within the scope of the present invention will occur to those skilled in the art, besides those alternatives mentioned supra. The apparatus is generally applicable to various types of exothermic catalytic reactions, such as the synthesis of ammonia or methanol by the catalytic conversion of the appropriate synthesis gas. In this case, stream 1 would consist of synthesis gas and streams 4 and 18 would be omitted. The apparatus is also applicable for the catalytic oxidation of sulfur dioxide to sulfur trioxide. The apparatus is also applicable in instances where a quench fluid which is different from the main process stream is to be added between stages of catalytic reaction. In this instance, the main process stream would be passed into unit 6 and the quench fluid would be introduced via duct 20. The apparatus is applicable to liquid phase exothermic catalytic reactions as well as gas phase reactions, however a preferred application for optimum results is in the exothermic catalytic reduction of nitrogen oxides in a waste gas stream. In this respect, it will be apparent that a single reducing gas stream may be employed, with streams 4 and 18 being omitted. In this case, the reducing gas stream would be added to stream 1, and the resulting mixed stream would be divided into streams 2 and 3. In another alternative, all of the reducing gas required for the elimination of nitrogen oxides in stream 1 may be added via stream 4, with stream 18 being omitted.

The duct 20 may extend horizontally into container 12 to a terminus below grid 17, or may extend vertically downwards external and adjacent to bed 16 and then extend horizontally inwards through partition 22 to a foraminous termination below grid 17. The provision of a foraminous outlet for duct 20 is a preferred embodiment of the invention, and in some instances duct 20 may merely be provided with an open outlet end or a tapered outlet end. The inverted truncated conical partition 22 may be alternatively replaced by other suitable means such as a curved or cylindrical section. The baffle 26 may consist of a flat horizontal disc-shaped unit in some instances, or may consist of a baffle which curves upwards or downwards from its center in an arcuate form, or may consist of an upright conical unit in the shape of a flat inverted V. The baffle 26 may even be omitted in some instances. In some instances, as for example when the catalytic reaction in bed 27 does not result in the generation of excessive temperature rise, elements 28, 29 and 30 may be omitted, in which case grid 31 would extend to the walls of container 12. The outlet nozzle 32 may be disposed in the side wall of container 12 below grid 31. The structure and apparatus elements in the assemblage have been described as generally cylindrical or circular coaxial units, however in suitable instances rectangular or square elements may be provided, as when handling large volumes of flue gas in an apparatus fabricated and constructed from sheet metal. Finally, the container 12 is preferably fabricated in upper and lower sections, which are joined by a gasketed or welded joint at the point where the baffle 13 is joined to the wall of container 12. The baffle 13 serves in most instances as an integral support for elements 14, 22, 15 and 17, and permits unrestricted thermal expansion without the provision of expansion joints.

We claim:

1. An apparatus for exothermic catalytic reactions which comprises a vertically oriented container, an annular partition baffle within said container, said partition baffle extending inwards from the vertical side wall of said container to a vertical conduit centrally disposed within said container, a first catalyst bed disposed in said container above the upper end of said conduit, said first catalyst bed being defined by an annular vertical partition, said vertical partition being spaced away from the side wall of said container so as to provide an annular vertical passage within said container, means to heat a first fluid stream to an elevated temperature of at least the minimum ignition temperature of said first catalyst bed, means to pass said heated first fluid stream into said container above said partition baffle, whereby said first fluid stream flows upwards through the annular vertical passage between said vertical partition and side wall of said container and then flows downwards through said first catalyst bed and is catalytically reacted, a duct extending into said container and terminating below said first catalyst bed, means to pass a cold second fluid stream through said duct whereby said cold second fluid stream is added to the hot fluid stream discharged from said first catalyst bed, means to pass the resulting combined fluid stream into the upper end of said central vertical conduit, whereby the combined fluid stream flows downward through said central vertical conduit, said central vertical conduit being provided with a plurality of spaced apart and staggered horizontal internal baffles, whereby the combined fluid stream is uniformly mixed within said central vertical conduit, a second catalyst bed disposed in said container below the lower outlet of said central vertical conduit, whereby the combined fluid stream discharged from said central vertical conduit flows through said second catalyst bed and is catalytically reacted, and means to remove a reacted fluid stream from said container below said second catalyst bed.

2. The apparatus of claim 1, in which said annular partition baffle extends downwards from the vertical side wall of said container to said central vertical conduit.

3. The apparatus of claim 1, in which said duct extends centrally downwards into said container and through said first catalyst bed to a lower terminus below said first catalyst bed.

4. The apparatus of claim 1, in which said duct is provided with a foraminous outlet section comprising a plurality of openings in the side wall of said duct.

5. The apparatus of claim 1, in which said horizontal internal baffles within said central vertical conduit are staggered by alternately providing an annular baffle extending inwards from the wall of said central vertical conduit, said annular baffle terminating at a central opening, followed by a lower central baffle which is spaced away from the wall of said central vertical conduit to provide an annular opening.

6. The apparatus of claim 1, in which a substantially horizontal fluid dispersion baffle is provided within said container below the lower end of said central vertical conduit, whereby said combined fluid stream is uniformly dispersed into said second catalyst bed.

7. The apparatus of claim 6, in which said fluid dispersion baffle is in the form of an inverted cone, whereby an upwards and outwards flow direction is imparted to the downflowing combined fluid stream.

8. The apparatus of claim 1, in which said second catalyst bed is defined by an annular vertical partition which is spaced away from the side wall of said container so as to provide an annular thermal insulation space within said container adjacent to said second catalyst bed.

9. The apparatus of claim 1, in which said container, said annular vertical partition external to said first catalyst bed, said central vertical conduit, and said duct are cylindrical and coaxial.

10. The apparatus of claim 1, in which said means to pass the resulting combined fluid stream into the upper end of said central vertical conduit comprises a partition which extends downwards and inwards, from the lower end of the vertical partition external to said first catalyst bed, to the upper end of said central vertical conduit.

11. The apparatus of claim 1, in which said duct terminates at an outlet adjacent to the upper end of said central vertical conduit.

12. An apparatus for the catalytic elimination of nitrogen oxides from a gas stream containing nitrogen oxides by exothermic catalystic reaction which comprises means to divide said gas stream into a first portion and a second portion, means to add reducing gas to said first gas stream portion and said second gas stream portion, whereby first and second mixed gas streams containing nitrogen oxides and a reducing gas are formed, a vertically oriented cylindrical container, an annular partition baffle within said container, said partition baffle extending inwards from the vertical side wall of said container to a cylindrical vertical conduit centrally disposed within said container, a first catalyst bed comprising a platinum group metal, said first catalyst bed being centrally disposed within said container above the upper end of said conduit and being defined by an annular vertical cylindrical partition which is coaxial with said container, said vertical partition being spaced away from the side wall of said container so as to provide an annular vertical passage within said container, means to heat said first mixed gas stream to an elevated temperature of at least the minimum ignition temperature of said first catalyst bed, means to pass said heated first mixed gas stream into said container above said partition baffle, whereby said first mixed gas stream flows upwards through the annular vertical passage between said vertical partition and the side wall of said container and then flows downwards through said first catalyst bed and is catalytically reacted, a vertical duct, said duct extending centrally downwards into said container through said first catalyst bed and terminating below said first catalyst bed, at least a portion of said duct below said first catalyst bed being foraminous, means to pass said second mixed gas stream through said duct whereby said second mixed gas stream is added to the hot gas stream discharged downwards from said first catalyst bed, an inverted truncated conical partition, said partition extending downwards from the lower end of said vertical cylindrical partition to the upper end of said conduit, whereby the resulting combined first and second gas stream flows downward through said central vertical conduit, said central vertical conduit being provided with a plurality of spaced apart and staggered horizontal internal baffles, whereby the combined gas stream is uniformly mixed within said central vertical conduit, a substantially horizontal gas dispersion baffle disposed within said container below the lower end of said central vertical conduit, whereby the combined gas stream is dispersed outwards below said central vertical conduit, a second catalyst bed comprising a platinum group metal, said second catalyst bed being disposed within said container below said gas dispersion baffle, whereby the combined gas stream discharged from said central vertical conduit flows through said second catalyst bed and is catalytically reacted, and means to remove the resulting reacted gas stream substantially free of nitrogen oxides from said container below said second catalyst bed.

13. The apparatus of claim 12, in which said annular partition baffle is in the form of an inverted truncated cone, and extends downwards from the vertical side wall of said container to said central vertical conduit.

14. The apparatus of claim 12, in which said horizontal internal baffles within said central vertical conduit are staggered by alternately providing an annular ring baffle extending inwards from the wall of said central vertical conduit, said annular baffle terminating at a central opening, followed by a lower circular central baffle which is spaced away from the wall of said central vertical conduit to provide an annular opening.

15. The apparatus of calim 12, in which said substantially horizontal gas dispersion baffle is in the form of an inverted cone, whereby an upwards and outwards flow direction is imparted to the downflowing mixed gas stream.

16. The apparatus of claim 12, in which said second catalyst bed is defined by an annular vertical cylindrical partition which is spaced away from the side wall of said container so as to provide an annular thermal insulation space within said container adjacent to said second catalyst bed.

17. The apparatus of claim 12, in which said duct terminates at a lower foraminous outlet which is adjacent to the upper end of said central vertical conduit.

References Cited

UNITED STATES PATENTS

| | | | |
|---|---|---|---|
| 2,317,449 | 4/1943 | Flock | 23—288 |
| 2,369,478 | 2/1945 | Mekler et al. | 23—288 |

MORRIS O. WOLK, *Primary Examiner.*

M. D. BURNS, *Assistant Examiner.*

U.S. Cl. X.R.

23—2